US008161536B1

(12) United States Patent
Subramaniam et al.

(10) Patent No.: US 8,161,536 B1
(45) Date of Patent: Apr. 17, 2012

(54) AUTHENTICATING SESSIONS IN QUERYABLE CACHES

(75) Inventors: Mahesh Subramaniam, Foster City, CA (US); Debashish Chatterjee, Fremont, CA (US); Debashis Saha, Foster City, CA (US); Lakshminarayanan Chidambaran, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2056 days.

(21) Appl. No.: 09/881,537

(22) Filed: Jun. 14, 2001

(51) Int. Cl.
*H04L 29/06* (2006.01)
(52) U.S. Cl. ............................................ 726/7; 707/782
(58) Field of Classification Search ................ 707/9–10; 709/219, 223, 225–227, 229; 713/153, 155, 713/168, 182, 201–202
See application file for complete search history.

(56) References Cited

U.S. PATENT DOCUMENTS

| | | | | |
|---|---|---|---|---|
| 5,768,525 | A * | 6/1998 | Kralowetz et al. ............ | 709/228 |
| 6,212,640 | B1 * | 4/2001 | Abdelnur et al. ............ | 713/201 |
| 6,243,715 | B1 | 6/2001 | Bogantz | |
| 6,446,109 | B2 * | 9/2002 | Gupta ............................ | 709/203 |
| 6,466,936 | B1 * | 10/2002 | Ronstrom ....................... | 707/10 |
| 6,484,258 | B1 * | 11/2002 | Haverty ......................... | 713/155 |
| 6,965,939 | B2 * | 11/2005 | Cuomo et al. ................. | 709/229 |
| 2002/0091757 | A1 * | 7/2002 | Cuomo et al. ................. | 709/203 |

OTHER PUBLICATIONS

Security Services Markup Language (S2ML), Feb. 2001.*
Mirsha et al., Security Services Markup Language, Jan. 2001.*

* cited by examiner

*Primary Examiner* — Minh Dinh
(74) *Attorney, Agent, or Firm* — Vista IP Law Group, LLP

(57) ABSTRACT

Techniques for authenticating users when an operation requested by a user in one of the systems of a distributed system is redirected to another system of the distributed system. The user is authenticated in the usual way to the one system but is authenticated to the other system for the redirected operation by an authentication proxy in the first system. The fact that the authentication proxy is providing a redirected operation means that the user who requested the operation has been authenticated to the one system. The other system is thus able to authenticate the user for the redirected operation with different authentication information than would otherwise be required. An example of how the techniques are used is a distributed database system where one of the database systems in the distributed system is a cache for another of the database systems.

19 Claims, 5 Drawing Sheets

FIG. 1—Prior Art

AUTHENTICATING SESSIONS IN QUERYABLE CACHES

CROSS REFERENCES TO RELATED APPLICATIONS

The present patent application is being filed on even date with three other patent applications addressed to techniques for improving queryable caches. The present patent application is also related to U.S. Ser. No. 09/294,656, Cusson, et al., Web servers with queryable dynamic caches, filed Apr. 19, 1999 and to its PCT counterpart, PCT/US00/10516, which was published Oct. 26, 2000 as WO 00/63800. All of the related applications have a common assignee.

BACKGROUND OF THE INVENTION

1. Field of the Invention

The invention relates generally to techniques for making frequently-referenced data more available to programs using the data and more specifically to techniques for making distributed queryable caches of data that is contained in large databases. The caches are transparent to the program that is querying the large data base in that the program generally need not be altered when a cache is added.

2. Description of Related Art

Local and Remote Copies of Data

A common problem in data processing systems is that frequently-used data cannot be quickly accessed, either because there is not enough capacity in the connection between the processor and the data storage or because too many program executions are contending for access to the data storage. One way of solving the problem is to make a copy of the data and put the copy in a location where it is more accessible to some of the program executions that are using the data. Those program executions can then reference the copy of the data in the more accessible location rather than the original data. In the following, the more accessible copy will be called the local copy, while the less-accessible original will be called the remote copy. It is to be understood, of course, that the terms remote and local represent degrees of accessibility and that both copies may be physically in the same location.

The local copy may be a complete copy of the data or it may be only a partial copy; further, the local copy may or may not be transparent to the executing program. When the local copy is transparent, the executing program can refer to a data item in exactly the same fashion as it did before the local copy existed. The reference goes first to the local copy. If the data is there (this is termed a hit), the data is retrieved from the local copy. If the data is not there (this is termed a miss), the reference goes automatically to the remote copy and the data is retrieved from the remote copy. When the local copy is not transparent, the program must be changed to take into account the fact that references are made to the local copy, instead of to the remote copy. In general, local copies of remote data that are both partial and transparent to the executing program are termed caches. Transparence is a relative term. Though the executing program need in general not be modified when the cache is added, the presence of the cache may result in some differences in the program's behavior, and in some cases the differences in behavior may require modification of the program.

Whenever there are local and remote copies of data, the copies must be kept consistent with each other. This is easy only if the data never changes; if it does change, then changes in one of the copies must be propagated to others of the copies. In some cases, the local copy is read only; the programs using it cannot change it, but changes in the remote copy are propagated to the local copy. In other cases, the local copy is updateable, and when this is the case, the updates must be propagated to the remote copy. When the propagation is done depends on how consistent the copies must be. For example, if the copies can be inconsistent for a whole working day, changes need only be propagated once a day. On the other hand, if it is required that the copies are always consistent, any change must be propagated immediately.

Local and Remote Copies of Databases

Databases are organized collections of data in which sets of data items are accessed by queries. The query describes the set of data items to be accessed in terms of the database's organization. The most common kind of organization for databases is relational: the data is organized into tables with named columns and rows. Each row has a field for each of its columns. A field for a column in a row contains that row's value for the column. Values in the fields can serve to uniquely identify rows of the database and to relate rows in one table to rows in a different table. A set of data items contained in a relational database is specified in terms of rows and columns of the table the items are in and values in the row or rows that contain the items. The following Employees table offers a simple example:

| emp_id | emp_name | emp_pay |
|--------|----------|---------|
| 000001 | "Owner"  | $1,000,000 |
| ...    | ...      | ...     |
| 000999 | "Drudge" | $20,000 |

This table has three columns and a row for each employee. the emp_id field of an employee's row contains a unique identifier for the employee; the emp_name field contains the employee's name; the emp_pay field contains the employee's current pay.

Relational database systems use a language called SQL to specify data sets. An SQL request on a database describes an operation to be performed on a set of data in the database. The most common kind of request is a query, which describes an operation that reads the set of data. Other requests may modify the set of data or delete the set of data. For example, an SQL query to find out how much employee "Owner" makes might look like this:

SELECT emp_pay FROM Employees
WHERE emp_name="Owner"

This instructs the data base system to return the value of emp_pay from the row of the table Employees in which the field Emp_name has the value "owner". The result of the query will be "$1,000,000". A database system contains not only the data, but also a description of the manner in which the data is organized. In the following, the description will be termed a data dictionary. Elsewhere, it may be termed the data base system's metadata or its schema.

Many organizations keep huge amounts of information in large central databases. As networks have grown, so has the potential for these large databases to be bottlenecks. The bigger the network, the more users, and the greater the problems caused by contention for the data base. Moreover, the network's carrying capacity is always less than the demands being made on it. As a result, it often takes a long time to transmit the query to the database, have the database perform the query, and have the results returned to the user. The development of the World Wide Web has of course increased all of these problems enormously. The database that contains the catalog of a Web merchant is accessible to literally everyone who has a connection to the Internet, and delays in getting a response are not only unpleasant for the user, but bad for the Web merchant's business.

A common approach to solving bottlenecks caused by databases is by replicating the data base. As the name implies, a replicated data base has a copy at another location. When a set of replicated databases is set up, methods are specified for keeping the replications consistent. A replicated database may be a complete copy of the database it is a replication of, or a partial copy. In the latter case, the partial copy is termed a materialized view. A materialized view may be read only, in which case, it is kept consistent with the database it is a copy of, but cannot be updated by the user, or it may be updateable, in which case the data items in the materialized view may be updated and the updates are propagated to the database of which the materialized view is a copy. A replicated database system provided by Oracle Corporation, of Redwood Shores, Calif., USA, is described in detail in the document Oracle 8i Replication, available in May, 2001 at http://technet.oracle.com/doc/server.815/

A problem with materialized views is that they are not transparent to the application program. If the application program provides a query to the materialized view that specifies a set of data items that is not in the materialized view but is in the database the materialized view was replicated from, the query simply fails, and the application must attempt it again on the database the materialized view was replicated from. Materialized views are consequently typically used in situations where it is possible to completely predict what queries will be made from a given remote location. The database tables needed to answer those queries are included in the materialized view, and since a miss never occurs, the fact that the materialized view provides no support to an application that has experienced a miss is not a problem.

However, as networks expand and more and more people need access to databases to do their jobs or to purchase products, selecting the right materialized view becomes more and more difficult. Oracle Corporation has responded to this problem by developing the queryable database cache described in published PCT application WO 00/63800, Oracle Corporation, Web Servers with queryable dynamic caches, published 26 Oct. 2000 and claiming priority from U.S. Ser. No. 09/294,656, Cusson, et al., Web servers with queryable dynamic caches, filed Apr. 19, 1999. The cache of WO 00/63800 is transparent. When an application program makes a query on the cache, the query goes to a data access layer, which provides the query to the cache. If the query misses, the data access layer redirects the query to a remote database. There is thus no need for the application to know anything about either the cache or the remote database.

Though the queryable cache described in WO 00/63800 does have the fundamental advantage of transparency to the application program, experience with the cache has revealed some areas where improvement is needed:

The queryable cache needs to be transparent not only to the application program, but also to the data access layer.
The queryable cache needs to handle SQL requests that reference stored procedures.
There needs to be an easy way of setting up the cache so that it has all of the copies of objects that it needs to function and also has the objects necessary to link the cache to the remote database system that it is a partial copy of There needs to be a way of making a user session to perform redirected operations in the remote database without requiring a password from the user to make the session.
The two-stage commit process used for transactions between distributed databases needs to be optimized for the situation where the transaction does not result in modifications to particular ones of the distributed databases.

It is an object of the invention disclosed herein to solve one or more of the foregoing problems. As will be described in more detail in the following, the problems have been solved in an implementation of the queryable cache which is based on Oracle's techniques for making replicated databases that contain materialized views.

SUMMARY OF THE INVENTION

When a user of a database system requests an operation that cannot be performed in the database system, but must be redirected to another database system, the user must be authenticated to the other database system before the operation can be performed in the other database system. Authentication of the user for whom a redirected operation is performed to the target database system that is performing the redirected operation is simplified by the use of an authentication proxy in the redirecting database that has itself been authenticated to the target database system. The authentication proxy enables the redirection only if the user has been authenticated in the redirecting database, and because that is the case, the target database system treats the enablement of the redirection as an authentication of the user. The technique is not restricted to database systems, but may be employed in any distributed system in which an operation that is to be performed for a user in one of the component systems but cannot be is redirected to another component system for performance.

Because the authentication proxy authenticates the user for whom the redirected operation is performed to the target database system, the redirecting system may provide authentication information to the target system which is different from the authentication information used to authenticate the user to the target system. One example of this in systems in which the authentication information is a username and password is basing authentication of the user in the target system on authentication by the authentication proxy and the username. The fact that no passwords are needed for redirection simplifies management of redirection in the redirecting system.

The technique is particularly advantageous when the redirecting database contains a subset of the objects in the target database and redirections occur because an object necessary to perform the request is lacking in the subset.

Other objects and advantages will be apparent to those skilled in the arts to which the invention pertains upon perusal of the following Detailed Description and drawing, wherein:

Figure 1:
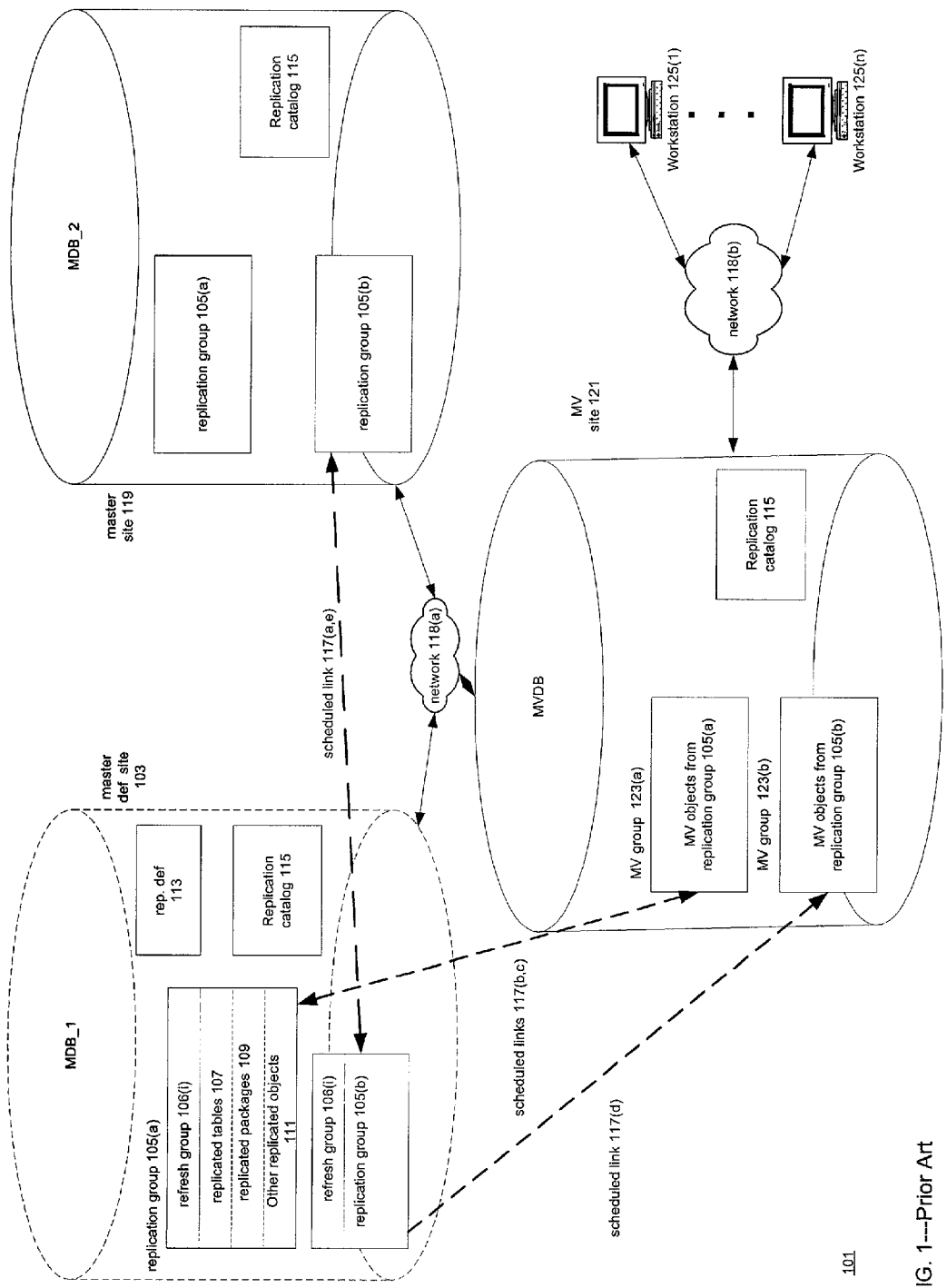
FIG. 1 is a block diagram of a prior-art distributed database system with replication.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first describe database replication as it is implemented in the Oracle 8i® database system to the extent necessary to understand the invention and will then describe the invention itself.

Overview of Distributed Data Bases and Replication: FIG. 1

Distributed Databases

A distributed database is a set of databases that appear to an application program as a single database. Database objects are stored in the databases. Among database objects are database tables, packages of procedures that operate on the tables, trigger procedures that are executed in response to changes in the tables, and indexes for the tables. In the Oracle 8i database system, objects are organized into schemas associated with users of the database. The user with which a schema is associated is termed the owner of the database objects in the schema. An SQL request may reference any of the database objects in the database. When a request references a stored procedure, the database system invokes the stored procedure. FIG. 1 shows a prior-art distributed database 101. Three databases, 103, 119, and 121, contain information which is used by applications running on a workstation 125(*i*). The databases exchange information among themselves via network 118(*a*); workstation 125(*i*), along with a number of other workstations, has access to database 121 via network 118(*b*). In a typical configuration, network 118(*a*) may be an intranet belonging to the organization to which the three databases belong. Database 121 may be located at a server that responds to the World Wide Web protocols, network 118(*b*) may be the Internet, and workstation 125(*i*) may be executing a Web browser program. In such a configuration, the user of workstation 125(*i*) provides the server with information that the server uses to make an SQL request to be executed in database 121. The server then incorporates the results of the request in a Web page which it returns to workstation 125(*i*).

When references are made to objects in distributed database 101, the reference must specify not only the object within a database, but also the database itself. Thus, a reference to an object contained in database 103 must employ the name of that database, MDB_1, as part of the reference. References that include the name of the database that contains the object are called global references. The totality of possible global references make up the global name space of the distributed database 101.

A database that belongs to a distributed database may refer to an object in another of the databases in the distributed database by means of a link. A link is a pointer in one database to an object in another. The pointer includes the global name of the object in the other database. A reference made via a link further contains sufficient information about the source of the reference so that the database that includes the object can determine whether to grant access to the object. There are two kinds of links:

A redirection link replaces an object in one database of a distributed database system with a reference to another database of the system that contains the object. The database with the link uses the link to redirect the reference to the other database.

A scheduled link is used to keep copies of objects in different ones of the databases consistent with one another. Scheduled links will be explained in detail below.

Replication

Replication is the process of copying and maintaining database objects in multiple databases that make up a distributed database system. The objects that are copied and maintained are termed replicated objects. When a replicated object is modified in one of the databases, the modification is captured and stored locally before being forwarded and applied at each of the other databases. Systems 103, 119, and 121 contain replicated objects and are termed replication sites. There are two basic kinds of replication: multimaster replication and materialized view replication. Replication may further be done synchronously, i.e., modifications are propagated to the other replication sites substantially when they are made, or asynchronously, i.e., the modifications are propagated at some later time.

Multimaster replication is done in database systems that are master replication sites. There are two such sites in FIG. 1, site 103 and site 119. Each of these master replication sites contains copies of all of the database objects in two replication groups 105(*a*) and 105(*b*). The objects in the replicated groups are the replicated objects in the database. In each database system, replication catalog 115 specifies the replicated objects and the groups they belong to. Included in replication catalog 115 are scheduled links 117 between the replicated objects in the replication groups. Double-ended arrows indicate a link in each direction. The scheduled links define how updates are propagated between the replicated objects so that the objects belonging to the replication groups in the master replication sites remain consistent. When the link specifies a synchronous update, the update is propagated as soon as it is made; when the link specifies an asynchronous update, the updates are propagated in batches. Database system 103 is further a master definition site, which serves as a control point for replication in all three of the database systems of system 101. Replication definition 113 contains the information which master definition site 103 needs to control replication in system 101.

Materialized view site 121 differs from master sites 103 and 119 in that it contains materialized view groups instead of replication groups. A materialized view group may contain fewer than all of the objects in a replication group 105. In addition, a table in a materialized view group may contain less than all of the data in the corresponding object in the master site or may include material from several tables in the master site. Such tables are generally termed views. In many cases, there is no actual table in the database system corresponding to a view; when a query specifies a view, the data specified by the query on the view is simply retrieved from the tables upon which the view is defined. A table that actually exists in the database system is termed a base table. There are situations in which an independent table corresponding to a view is produced and included in the database. Such tables are termed materialized views. Materialized view site 121 is so called because its database stands in the same relationship to the database in its master site 103 as a view stands to its base tables and because tables corresponding to the views on base tables in master site 103 that are included in site 121 really exist in site 121.

Thus, materialized view group 123(*a*) contains objects from replication group 105(*a*), while materialized view group 123(*b*) contains objects from replication group 105(*b*). An object that belongs to a materialized view group is termed herein a materialized view object. Materialized view objects may be read-only or they may be updateable. In the former case, changes made in an object in a master site that corresponds to an object in a materialized view group are propagated to the materialized view group, but no changes can be made in an object in the materialized view group by an SQL request directed to the materialized view group.

When a materialized view object is updateable, changes made in the materialized view object are propagated to the corresponding object in the replication group corresponding to the materialized view group, and if there are other master sites, to the corresponding objects in the replication groups in those sites. Propagation of changes made in the materialized view object is as described generally for master sites. Propagation of changes from the master site to the materialized view are always done in batch mode. A given propagation of changes from the master site to the materialized view is termed a refresh of the materialized view. Refresh groups 106 for the materialized view may be specified in replication catalog 115. A refresh group may include objects from more than one replication group, as shown by refresh group 106(*i*) in master site 103. Refreshing is done by materialized view. There are two kinds of refresh:
   a complete refresh refreshes all of the data in a materialized view at once.
   a fast refresh merely refreshes all of the data in the materialized view which has changed since the last refresh.
The Oracle 8i system can be set to automatically perform a complete refresh when a fast refresh fails. Such a complete refresh is called a force refresh.

A major problem for the database administrator who is in charge of a distributed data base system that includes a materialized view is making sure that the materialized view database contains copies of all of the database objects that are referred to by the application programs using the materialized view. For example, if the application program calls a stored procedure and the stored procedure is not in the materialized view database, the call will fail. In order to properly design a materialized view database, the database administrator must not only understand the relationships between the tables that are being replicated in the materialized view, but also understand how these tables are queried by the application programs and what other objects the application program requires. Once the database administrator has obtained a correct design, the administrator can make a template that specifies the database objects that are required for the materialized view database and the materialized view database can use the template to copy the required objects from its master database.

A system like system 101 may of course have any number of master sites and a master site may have any number of replication groups. There may also be any number of materialized view sites 121, but each materialized view site 121 must obtain its materialized view objects from a particular one of the master sites. Other embodiments may permit materialized view sites 101 to have materialized view objects from replication groups in more than one master site.

Figure 2:
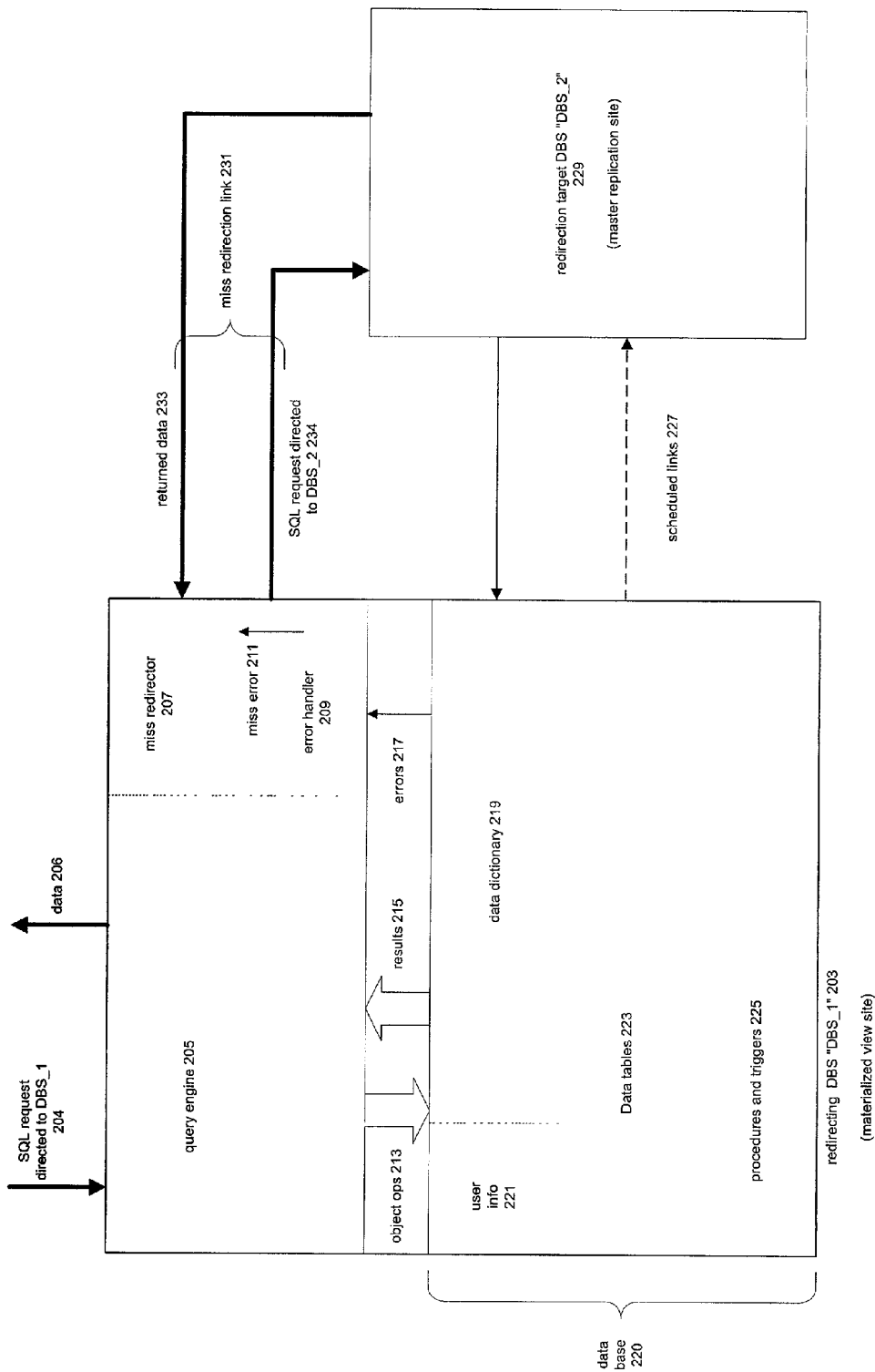
FIG. 2 is a block diagram of a distributed database system with replication in which a first database in the system that does not have a database object referred to in a request to which the first database responds redirects the request to a second database in the system.

Modifying a Distributed Database System with a Materialized View Site so that the Materialized View Site can Function as a Queryable Cache: FIG. 2

A materialized view site is like a queryable cache in that it responds to SQL requests and moves a subset of the database objects contained in a master site closer to the consumer of the data. It is unlike a queryable cache in that it is not transparent; when a data object is missing in the materialized view site but present in the master site, a SQL request that refers to the data object simply fails, rather than being automatically redirected to the master site. FIG. 2 shows how a distributed database system with a materialized view site can be modified to make the materialized view site function as a queryable cache.

Database system 201 in FIG. 2 includes a redirecting database system 203 which is a modified materialized view site and a redirection target database system 229 which is a master site for redirecting database system 203. Redirecting database system 203 has the global name DBS_1 and redirection target database system 229 has the global name DBS_2. At the highest level, database system 201 operates as follows:
1. Database system 203 receives an SQL request 204;
2. Database system 203 attempts to execute the SQL request; as part of executing the SQL request, database system 203 parses the request. As part of parsing the request, database system 203 resolves references in the request to database objects; if all of the references can be resolved, the request can be executed in database system 203 and database system 203 executes the request and returns the data 206 resulting from the execution to the source of the SQL request;
3. If any of the references cannot be resolved or parsing fails for other reasons, for example, if the user does not have the appropriate privileges on an object, a miss has occurred and database system 203 redirects part or all of the SQL request to database system 229, as shown by arrow 231;
4. Database system 229 executes the redirected portion of the SQL request and returns the results to database system 203 (arrow 233), which integrates it with any part of the results obtained in database system 203 and returns the complete results 206 to the source of SQL request 204.

Database system 201 differs from the system disclosed in WO 00/63800, Cusson, et al., Web servers with queryable dynamic caches, in that the redirection is done within database system 203, not in the data access layer. It should further be pointed out here that the techniques of database system 201 only require that all of the references in the request received in database system 203 be resolvable in one or another of a set of database systems that either themselves redirect SQL requests or are reachable by redirection from database systems that do, with all of the databases in the set being reachable either directly or indirectly by a redirection that begins from database system 203.

Continuing in more detail with database system 203, like all database systems, database system 203 includes a query engine 205 and a database 220. Query engine 205 resolves the references in SQL requests and performs the operations specified for the references on the objects specified by the references, as indicated by arrow 213. The results of the operations are returned to query engine 205, as shown by arrow 215. Database 220 has two main components: tables 223 and procedures and triggers 225. The procedures and triggers are stored programs that are executable by query engine 205. A procedure is executed when an SQL request includes a reference to the procedure; triggers are associated with other database objects and are executed when a condition under which the trigger is to be executed arises with regard to an object with which the trigger is associated. The tables include data dictionary 219, user information 221, and user tables 223. As its name implies, data dictionary 219 is a set of tables that describes all of the objects in the database system. User information 221 is tables that contain information about users of the system.

As with a standard materialized view site, database system 203 is connected by scheduled links 227 to redirection target database system 229. If database system 203 contains only read-only objects, then the only scheduled link needed is one (solid line) that provides for any necessary propagation of changes in database system 229's objects that have copies in database system 203 to database system 203. If database system 203 contains updateable objects, then there is a scheduled link (dashed line) that provides for propagation of the updates of these objects to database system 229.

Database system 203 has been modified from a standard materialized view site to enable redirection as follows:
- a miss redirection link 231 has been established between database system 203 and database system 209;
- code for a miss redirector 207 has been added to query engine 205.

Continuing in more detail with miss redirection link 231, miss redirection link 231 is a generalized mechanism for transferring an SQL request or a portion thereof from one database system to another. It therefore does not connect a representation of an object in one database to the object itself in another, but rather one database to another. Because it is a generalized mechanism, it can be used to transfer an SQL request when there is a miss. The redirection links used in distributed database system 101, by contrast, simply permit a reference in an SQL request to be resolved not to the data itself, but rather to a specification of another database where the data may be found. Because this is the case, a miss will not occur where there is a standard redirection link and consequently, standard redirection links cannot be used to deal with misses.

With regard to miss redirector 207, an error handler 209 is a standard component of database systems. When an error occurs while the database system is dealing with an SQL request, for example, the request contains a reference to an object that is not in the database system, the database system produces an error message that identifies the error. Error handler 209 handles the error, generally by examining the error message and invoking a function that deals with the error. In database system 203, the function that handles errors resulting from misses is miss redirector 207, which takes either the entire SQL request or the portion of the request that caused the miss and redirects it via miss redirection link 231 to redirection target database 229, as shown at 234. When the result of the redirected request or portion is returned via link 231, as shown at 233, miss redirector 207 provides the result to query engine 205 for inclusion with whatever results were obtained locally. In a preferred embodiment, the database system employs an exception handling mechanism: an exception handler is defined for a particular set of errors and when an error occurs, the query engine raises an exception that specifies the error and invokes the exception handler; in the preferred embodiment, if the error is a miss, the exception handler then invokes miss redirector 207.

Session Authentication

A user interacts with a database by means of an execution of a computer program either in the system that has the database or in another system that is connected to the database by a network. The computer program is executed by a process, and to distinguish the process from the processes in the database system, the process is termed a user process. The user process exchanges messages with the database system by means of a connection, and the interaction between the user process and the database system from the time the connection is established until the time the connection is terminated is termed a session.

At the beginning of a session, the user process must authenticate itself to the database system. There are many ways of doing this known to the art, but the most common way is for the user process to provide a username and a password to the database system. If the username and password are both known to the database system, the session is permitted to continue and the user process can access the database. The username and password, as well as any other information used to authenticate a user to the database system, are termed herein authentication information.

Authentication is more complicated in distributed database systems that permit redirection. In distributed system 101, when one of the database systems redirects an operation to another of the database systems, there must be a session on the other system to perform the operation. In order for that session to begin, the other database system must be provided with authentication information. In distributed system 101, the authentication information is specified in the redirection link used in the redirection. There are three ways of doing this, and which way a link specifies the user's identity must be defined when the link is created:
- A fixed user may be specified. In this case, the link contains a username and password and the password is used to authenticate the user.
- A connected user may be specified. In this case, when a reference is redirected via the link, the user authentication information is that of the user whose session performed the redirection.
- A current user may be specified. In this case, when a reference is redirected via the link, the user authentication information provided to the redirection target database system is that of the current user, i.e., the user for which the database system doing the redirection actually makes the reference.

The current user may differ from either the connected user or the fixed user. For example, some stored procedures have the property that when the stored procedure is executed, the user executing the stored procedure has the privileges of the user to whom the stored procedure belongs.

A single connection may be used for redirection by a number of different users. Each user has its own redirection link, with its own user authentication information, but the single connection is shared by the sessions belonging to the users. Such redirection links are termed shared redirection links. Each shared redirection link must include user authentication information for a user on the target database system. This user authenticates the shared link to the target database system. In data dictionary 219, each shared link is represented by a shared link object.

An SQL statement for setting up a shared link (i.e., causing a shared link object to be created) looks like this:

CREATE SHARED DATABASE LINK
   DBS2 CONNECT TO SCOTT
   IDENTIFIED BY TIGER
   AUTHENTICATED BY TRUSTED_USER
   IDENTIFIED BY TRUSTED_USER_PASSWORD
   USING 'dbs2'

This statement creates a link to redirection target database DBS2 for the user SCOTT of the redirecting database who has the password TIGER. The link is authenticated by the user of target DBS2 that has the username TRUSTED_USER and the password TRUSTED_USER_PASSWORD. The link will use the physical connection identified by 'dbs2'.

Drawbacks of authentication by password with redirection in system 201

In distributed database system 201, with redirecting DBS 203 and redirection target DBS 229, miss redirection link 231 is a shared redirection link. In system 101, each user of a redirection link is required to have a shared link that includes the user's authentication information, that is, each shared link must have its user's password. As a cache, redirecting DBS 203 will have many users, and each of these users must have a shared link with the user name and password. This requirement puts a large administrative requirement on the administrator of DBS 203, who must obtain and manage the passwords.

Figure 3:
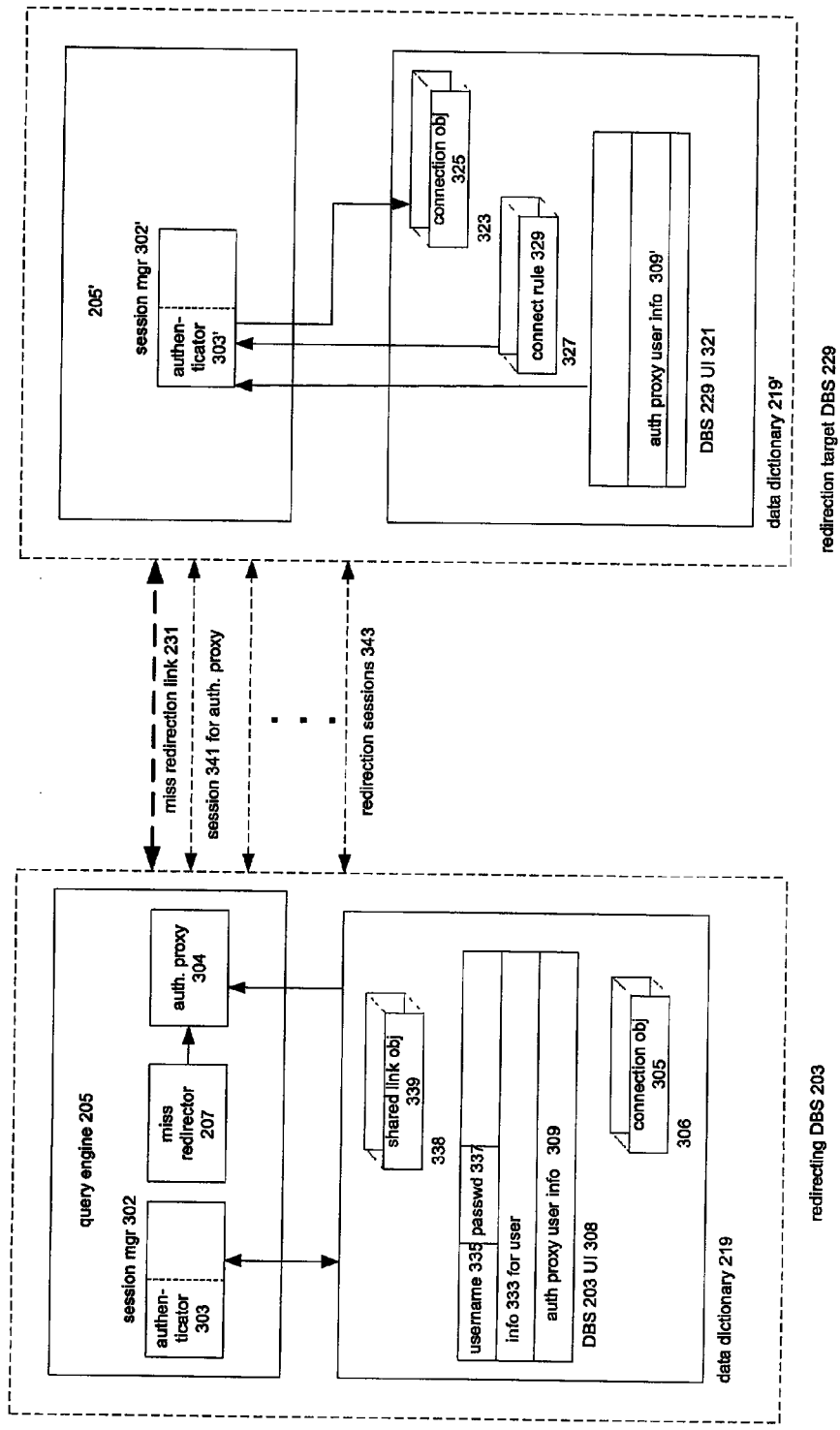
FIG. 3 is a block diagram of the components of an authentication proxy in system 201.

Solving the Problem with Proxy Authentication: FIG. 3

In system 201, the problem of passwords in the shared links is solved by means of an authentication proxy in redirecting database system 203. When redirecting database system 203 begins operating, it establishes a session for the authentication proxy that is connected to redirection target DBS 229 via miss redirection link 231. When a user process begins a session with redirecting database system 203, redirecting database system 203 obtains the user's username and password and authenticates the user in the usual fashion. The session then begins making SQL requests. Generally, the requests will be made by the session's user, but in some cases, the user may change during the session. On the first miss redirection for the session, the authentication proxy establishes a session for the session's user in redirection target database system 229. If the user changes, the authentication proxy establishes a new session for the new user in database system 229.

Instead of requiring that both username and password be provided when a session is established in DBS 229 for the session in DBS 203, target DBS 229 permits the authentication proxy to establish the session with only the username. The fact that it is the authentication proxy that is establishing the session provides the authentication of the user that would otherwise be provided by the password. The authentication proxy can provide the authentication, since the very existence of a miss redirection for a user in redirecting database system 203 means that the user has properly authenticated itself to database system 203.

FIG. 3 shows the details of authentication by the authentication proxy in system 201. In general, system 201 uses the same mechanisms for authenticating users and establishing sessions as system 101. All users of redirection target DBS 229 have user information in user information 321; included in this user information are the username and password (shown at 335 and 337). User information 308 in redirecting DBS 203 includes copies of all user information 333 that has been copied from redirection target DBS 229 to redirecting DBS 203. When a user establishes a session on redirecting DBS 203, session manager 301 makes a connection object 305 for the session.

When a session performs an operation for a user that requires redirection to redirection target DBS 229, there must be a session in redirection target DBS 229 to perform the redirected operation. Such sessions will be termed in the following redirection sessions.

In FIG. 3, the redirection sessions that are using miss redirection link 231 appear as dashed lines at 343. In system 201, all redirection sessions use miss redirection link 231. If a user is to have a session via a redirection link, there must be a redirection link object for the link and user; in the present context, only shared redirection links 339 for miss redirection link 231 are of interest, and the objects for these links are shown at 338. In redirection target DBS 229, the request to establish a session via a redirection link comes to session manager 302', which authenticates the user specified in the redirection link for the session and then creates a connection object 325 for the session.

The database system will establish a session for a user only if the privileges given the user by the database system include the privilege of connecting to the database system. As with all privileges in the database system, the privilege of connecting is governed by rules in data dictionary 219. A connect rule not only governs whether a user may connect, but how the user may connect. For example, a connect rule may establish that the request to establish a connection for the given user must be made by another user. Here is an example of the SQL used to specify such a connect rule:

ALTER USER SCOTT
  GRANT CONNECT THROUGH TRUSTED_USER;

The above specifies that SCOTT has been given the right to connect by means of a request made by the proxy whose user name is TRUSTED_USER. Objects for such connect rules 329 are shown at 327 in DBS 229.

As indicted above, a difference between system 101 and system 201 is that redirection sessions 343 are authenticated by authentication proxy 304 instead of by a password. In order to make this possible, modifications have been made in the SQL used to create a shared database link so that the user's password is no longer required. The new syntax is the following:

CREATE SHARED DATABASE LINK
  MISS_LINK CONNECT TO SCOTT
  AUTHENTICATED BY TRUSTED_USER
  IDENTIFIED BY TRUSTED_USER_PASSWORD
  USING 'dbs2';

The above creates the shared link MISS_LINK for the user with the USERNAME SCOTT. However, no password is required by SCOTT, Instead, SCOTT is authenticated by the user TRUSTED_USER, which is the username for authentication proxy 304.

The rest of the machinery by means of which authentication proxy 304 establishes redirection sessions 343 includes the following:

user information for authentication proxy 304 in both DBS 203 and DBS 229. Authentication proxy 304 is itself authenticated by a password in the preferred environment; and connect rules 329 in redirection target DBS 229 for each user for whom user information 333 has been copied to redirecting DBS 203 that specifies that a connection for the user may be established by authentication proxy 304.

In a preferred embodiment, the authentication proxy user information 309' and the connect rules 329 are created in redirection target DBS 229 when the copy of the portion of DBS 229's database which is to be contained in DBS 203 is made. DDL specifications for the authentication proxy user information 309 and the shared link objects 338 are further included in the copy along with the portion of the database; when DBS 203 begins to operate, the user information and the shared link objects are created from the DDL specifications. Of course, any other technique which made these components available in DBS 203 and 229 as required would also work.

Figure 4:
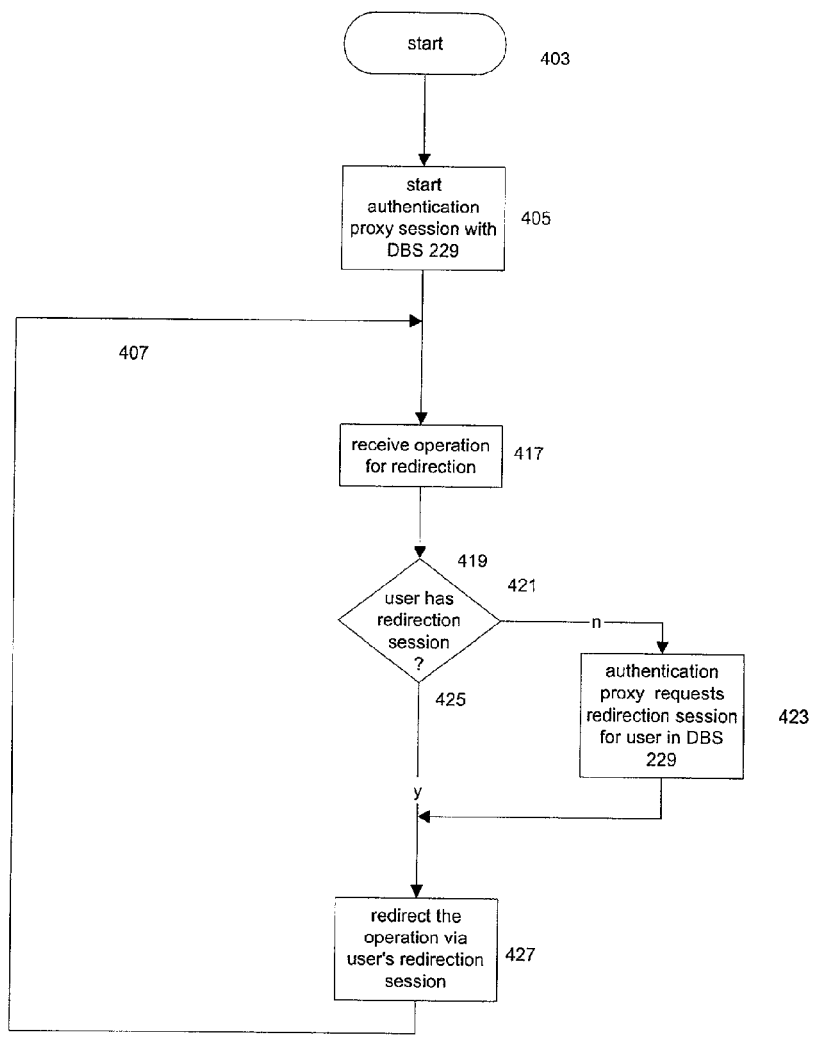
FIG. 4 is a flowchart of proxy authentication in redirecting DBS 203.
Figure 5:
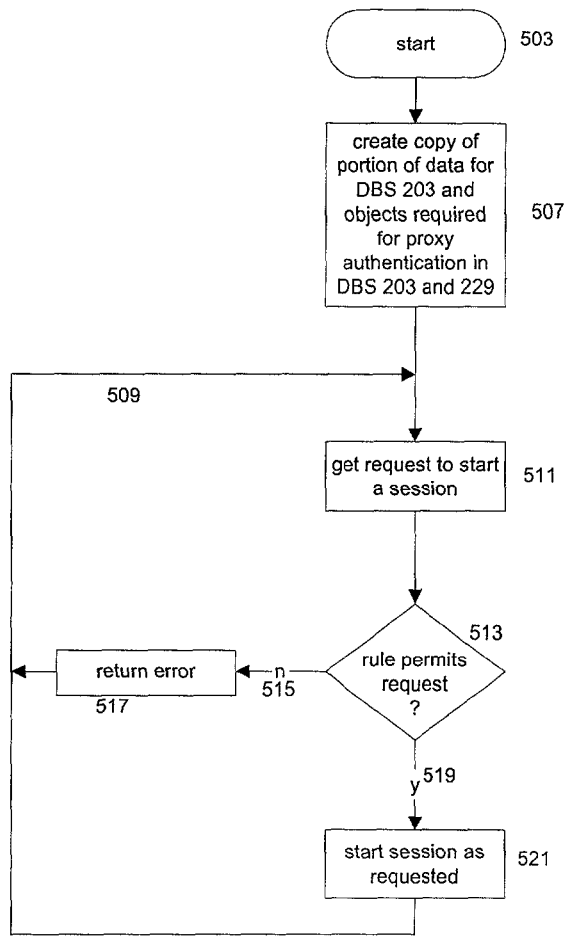
FIG. 5 is a flowchart of proxy authentication in redirection target DBS 229.

FIGS. 4 and 5 are flowcharts that show how proxy authentication is carried out in redirecting DBS 203 (FIG. 4) and redirection target DBS 229 (FIG. 5). Beginning with FIG. 5, at 507 is shown how the objects required for proxy authentication are created when the copy of the objects that are to be contained in DBS 203 is made in DBS 229. As a consequence of this, when DBS 203 is ready to commence operation, each user has a shared link object 339 in DBS 203, there is user information 309 for authentication proxy 304 in both redirecting DBS 203 and redirection target DBS 229, and there are connect rules 329 in DBS 229 which permit authentication proxy 304 to establish sessions for the users whose user information 333 has been copied to DBS 203 in DBS 229.

Continuing with FIG. 4, which shows proxy authentication in DBS 203, when DBS 203 begins operating, session manager 302 establishes a session for authentication proxy 304 with redirection target DBS 229 via miss redirection link 231 (405). Authentication proxy 304 authenticates itself to DBS 229 with its username and password. Then loop 407 is executed in which miss redirector 207 redirects operations. Each operation is received for redirection at 417. If the user already has a redirection session (417), redirector 207 redirects the operation via the redirection session. If not, miss redirector 207 uses authentication proxy 304 to establish the redirection session via the user's shared link. Authentication proxy 304 sends a request to redirection target DBS 229 to start the session for the user. When session manager 302' receives the request at 511 in flowchart 501, it proceeds as it does with any other request to start a session. It first authenticates the user and then determines whether the rules 329 permit the request (513). If they do, the session may be created and started (521). When the session is created, a connect object 325 is made for the session. Otherwise, an error is reported to the requestor (517). Of course, here, each user who has user information 333 in DBS 203 will have a rule 329 in redirection target DBS 229 which permits authentication proxy 304 to establish a session for the user.

An advantage of the above implementation of proxy authentication is that whether authentication proxy 304 can actually establish a session for a user in redirection target DBS 229 is determined by connect rules 327 in DBS 229, and thus the manager of redirection target DBS 229 retains complete control of what proxy 304 can authenticate. Indeed, the rules apply to authentication proxy 304 in any redirecting DBS 203 that is redirecting operations to redirection target 229.

As explained above with regard to stored procedures, SQL requests made by a given session in redirecting DBS 203 may be made for users other than the session's user. In a presently-preferred embodiment, when such a request is made, the authentication proxy requests a new session for the new user; thus a given session may have a corresponding session in target DBS 229 for each user for which the session makes requests, resulting in a one-to-many correspondence between the given session and sessions in target DBS 229.

In other embodiments, there may always be a 1-to-1 correspondence between the given session in redirecting DBS 203 and a session in redirection target DBS 203. In such an embodiment, the session in target DBS 229 must be able to switch the current user as the users for the operations being redirected change. When a redirected operation is received via the session for a new user, the session switches the current user to that user and then performs the redirected operation. To ensure the connected user in target DBS 229 is the same as the connected user in redirecting DBS 203, the redirection session can initially be created on behalf of the connected user in the redirecting DBS 203 regardless of the current user at the time of the first redirection request.

One way of providing the session in target DBS 229 with the information necessary to do the switching would be to piggyback the identification for the user for whom the request is being performed onto the request. An optimization of this would be for the authentication proxy to keep track of the current user for the session in target DBS 229 and piggyback the user identification only when the user for the next redirection request is different from the current user for the session in target DBS 229.

CONCLUSION

The foregoing Detailed description has disclosed to those skilled in the relevant technologies how to make and use the inventors' authentication proxy and has further disclosed the best mode presently known to the inventors of implementing their invention. The Detailed description described an implementation of the invention in a preexisting distributed database system, and as would be expected, details of the implementation are determined by and take advantage of features of the distributed database system. The invention is, however, by no means limited to the particular distributed database system in which it is implemented or to distributed database systems generally, but may be employed in any distributed system where a component of the distributed system receives a request for an operation which it cannot perform and redirects the operation to another component of the distributed system for performance.

The invention is further not limited to the username and password used to authenticate users in the distributed database system of the implementation, but may be used with any kind of authentication information. Moreover, while the implementation described herein simplifies authentication in the component to which the operation is redirected by making a component of the original authentication information unnecessary, other implementations may otherwise modify the authentication information or even replace the authentication information used in the redirecting component with different authentication information. In other embodiments, the enablement of the redirection by the authentication proxy may be all the authentication information that the other component requires.

For all of the foregoing reasons, equivalents to the structures and methods disclosed in the Detailed Description are intended to include not only equivalent structures and methods in other database systems, but equivalent structures and methods in distributed systems generally. Further, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. In a distributed system that includes a system and another system, apparatus for authenticating a user to the another system, the user having non-public authentication information particular to the user in the system, the user requesting performance of an operation in the system and the system authenticating the user and redirecting the operation to the another system for performance, the apparatus comprising:

at least one processor that is at least to:
  authenticate the user on the system using at least a username and the non-public authentication information both particular to the user;
  receive an operation, which references one or more stored procedures that are executed to complete the operation, from the user on the system, the system comprising a database view that does not include at least one of the one or more stored procedures to complete the operation;
  authenticate or cause to authenticate an authentication proxy in the system on the another system using credentials of the authentication proxy rather than using the non-public authentication information particular to the user;
  use the authentication proxy to redirect the operation to the another system, wherein
    the authentication proxy having a privilege that permits the authentication proxy to enable the another system to perform and complete the operation for the user; and
  perform modifications on the database view, which does not redirect the operation before the modifications, on the system to support redirection from the database view to the another system that includes the at least one of the one or more stored procedures to complete the operation.

2. The apparatus for authenticating a user set forth in claim 1, wherein
the privilege enables the another system to perform the operation on a basis of the username, without the non-public authentication information.

3. The apparatus for authenticating a user set forth in claim 2 further comprising:
a link in the system to the another system, in which the link is used for the redirection and specifies the user only by username.

4. The apparatus for authenticating a user set forth in claim 2, wherein
the non-public authentication information comprises a password for the user on the system.

5. The apparatus of claim 1, wherein:
the authentication proxy enables redirection of the operation by requesting a session for the user in the another system; and
the privilege is used for requesting a session from the system for the user in the another system.

6. The apparatus of claim 1, the action for authenticating or causing to authenticate the authentication proxy comprises:
sending an authentication request from the system to the another system to authenticate the authentication proxy on the another system, in which
the authentication request includes the credentials of the authentication proxy and the username of the user but not the non-public information particular to the user.

7. The apparatus of claim 6, the action for authenticating or causing to authenticate the authentication proxy further comprises:
creating a session between the authentication proxy and the another system for the another database session to perform the operation without receiving the non-public information of the user from the system or from the user in which the action for authenticating or causing to authenticate the authentication proxy requires only the username of the user but does not require the non-public information particular to the user.

8. The apparatus of claim 7, in which the action for authenticating or causing to authenticate the authentication proxy further comprises:
transmitting one or more query requests for the operation by the system rather than by the user;
determining whether the user changes, in which a results of the action of determining whether the user changes is used in the action of creating the session between the authentication proxy and the another system; and
determining whether a user's privilege permits connecting to the another system.

9. The apparatus for authenticating a user set forth in claim 7, further comprising:
a link in the system to the another system, in which the link is used for the session and specifies the user only by username but not the non-public authentication information.

10. The apparatus for authenticating a user set forth in claim 9, wherein
the distributed system comprises a distributed database system, and the system and the another system comprise database systems in the distributed database system.

11. The apparatus of claim 10, wherein
the operation to be performed for the user comprises a database operation and the operation is redirected to the another system when the operation results in a miss in the system.

12. The apparatus of claim 11, wherein
the system comprises a subset of objects in the another system; and
the operation is redirected to the another system when an object involved in the operation is not in the subset.

13. A memory device that is accessible to the system and the another system of claim 1, the memory device being characterized in that:
the memory device includes code which, when executed by at least one processor in the system, implements the process of claim 1.

14. In an improved distributed database system of the class wherein a database system in the distributed database system redirects an operation to be performed for a user to another database system in the distributed database system, the user having non-public authentication information particular to the user in the database system, a computer implemented method of redirecting the operation from the database system to the another database system, the computer implemented method comprising:
using at least one processor to perform a process, the process comprising:
authenticating the user on the database system using at least a username and the non-public authenticating information both particular to the user;
receiving an operation, which references one or more stored procedures that are invoked to complete the operation, from the user on the database system, the database system comprising a database view that does not include at least one of the one or more stored procedures to complete the operation;
using an authentication proxy to redirect the operation to the another database system, wherein the action of using the authentication proxy to redirect the operation comprises:
authenticating or causing to authenticate the authentication proxy in the database system on the another database system using credentials of the authentication proxy rather than using the non-public authentication information particular to the user, in which
the authentication proxy having a privilege that permits the authentication proxy to enable the another database system to perform and complete the operation for the user;
performing modifications on the database view, which does not redirect the operation before the modifications, on the system to support redirection from the database view to the another system that includes the at least one of the one or more stored procedures to complete the operation.

15. The computer implemented method of claim 14, the action for authenticating or causing to authenticate the authentication proxy comprises:
sending an authentication request from the database system to the another database system to authenticate the authentication proxy on the another database system, in which
the authentication request includes the credentials of the authentication proxy and the username of the user but not the non-public information particular to the user.

16. The computer implemented method of claim 15, the action for authenticating or causing to authenticate the authentication proxy further comprises:
creating a session between the authentication proxy and the another database system for the another database session to perform the operation without receiving the non-public information of the user from the database system or from the user.

17. The computer implemented method of claim 16, in which the action for authenticating or causing to authenticate the authentication proxy requires only the username of the user but does not require the non-public information particular to the user.

18. The computer implemented method of claim 14, the action for receiving an operation from the user on the database system comprises:
directing the operation from the user to a cache on the database system; and
determining whether the cache on the database system satisfies the operation from the user.

19. The computer implemented method of claim 16, the action for authenticating or causing to authenticate the authentication proxy further comprises:
transmitting one or more query requests for the operation by the database system rather than by the user;
determining whether the user changes, in which a results of the action of determining whether the user changes is used in the action of creating the session between the authentication proxy and the another database system; and
determining whether a user's privilege permits connecting to the another database system.

* * * * *

UNITED STATES PATENT AND TRADEMARK OFFICE
CERTIFICATE OF CORRECTION

PATENT NO. : 8,161,536 B1
APPLICATION NO. : 09/881537
DATED : April 17, 2012
INVENTOR(S) : Subramaniam et al.

It is certified that error appears in the above-identified patent and that said Letters Patent is hereby corrected as shown below:

On front page, in column 2, under "Abstract", line 5, delete "system" and insert -- system, --, therefor.

On Sheet 3 of 5, in figure 3, Box no. 337, line 1, delete "passwd" and insert -- password --, therefor.

In column 2, line 36, delete "the" and insert -- The --, therefor.

In column 3, line 67, delete "copy of" and insert -- copy of. --, therefor.

In column 11, line 50-61, delete "In FIG. 3,...session." and insert the same on Col. 11, Line 49, after "sessions." as a continuation of the same Paragraph.

In column 12, line 16-17, delete "following;" and insert -- following: --, therefor.

In column 16, line 51, after "user;" insert -- and --.

Signed and Sealed this
Thirty-first Day of July, 2012

David J. Kappos
*Director of the United States Patent and Trademark Office*